United States Patent [19]
Choi

[11] Patent Number: 5,968,373
[45] Date of Patent: Oct. 19, 1999

[54] FILTER ARRANGEMENT HAVING AT LEAST TWO SUCCESSIVE LAYERS HAVING PREDETERMINED SPACING AND ITS METHOD FOR MAKING

[75] Inventor: Kyung-Ju Choi, Jefferson, Ky.

[73] Assignee: AAF International, Louisville, Ky.

[21] Appl. No.: 08/996,222

[22] Filed: Dec. 22, 1997

[51] Int. Cl.$^6$ .................................................. B01D 29/56
[52] U.S. Cl. ...................... 210/806; 210/489; 210/493.5; 55/487; 55/500; 55/521
[58] Field of Search ......................... 210/321.77, 321.86, 210/488, 489, 493.1, 495.5, 494.1, 767, 500, 806; 55/487, 486, 498, 521, 500

[56] References Cited

U.S. PATENT DOCUMENTS

| | | |
|---|---|---|
| 4,322,385 | 3/1982 | Goetz . |
| 4,589,983 | 5/1986 | Wydevan ................................ 210/317 |
| 4,661,255 | 4/1987 | Humann et al. ......................... 210/491 |
| 4,732,675 | 3/1988 | Badolato et al. ....................... 210/314 |
| 5,082,476 | 1/1992 | Kahlbaugh et al. ......................... 55/97 |
| 5,275,743 | 1/1994 | Miller et al. ............................. 210/767 |
| 5,858,045 | 1/1999 | Stemmer et al. . |

OTHER PUBLICATIONS

Pore size characteristics of membrane filters by bubble point and mean flow pore test; "No date available".

Air Permeability and Pore—Distribution of a Duhl–Layered Microglass Filter Medium—Kyung–Ju Choi (1994).

Pore Distributions and Permeability of Cellulosic Filtration Media—Kyung–Ju Choi; V.7, No. 1; Mar. 1994.

Permeability—Pore Size Relationship of Nonwoven Filter Media—Kyung–Ju Choi; (1995).

Prediction of Air Permeability and Pore Distribution of Multi–Layered Nonwovens—Kyung Ju Choi; V.6, No. 3 "No date available".

Fluid Flow Through Filter Media at a Differential Pressure Across Media—Kyung–Ju Choi; V.9 No. 2, Jun. 1996.

*Primary Examiner*—W. L. Walker
*Assistant Examiner*—Marianne S. Ocampo
*Attorney, Agent, or Firm*—Polster, Lieder,Woodruff & Lucchesi

[57] ABSTRACT

A filter apparatus and method wherein successive layers of filter medium are spaced apart from each other a preselected distance to create a substantially direct, in-line through-flow void space therebetween evaluated upon the porosity and thickness of the successive filter mediums, pleated spacer/filter arrangements being employed to create a combined overall filter media with an included through-flow void space for fractionated distribution of particles between the successive layers of filter medium to maximize particulate holding capacity of the overall filter media.

11 Claims, 4 Drawing Sheets

FILTER ARRANGEMENT HAVING AT LEAST TWO SUCCESSIVE LAYERS HAVING PREDETERMINED SPACING AND ITS METHOD FOR MAKING

BACKGROUND OF THE INVENTION

The present invention relates to multi-layered filter media and more particularly to a unique and novel apparatus and method of improving the capacity of particulate removal of a multi-layered filter media.

It has been long known in the filtration art to separate particulate material from a particulate-laden fluid stream by passing such fluid stream at a given face velocity through a variable density sheet of filter medium of a preselected face area with the density of the filter medium increasing from the upstream face of the filter medium toward the downstream face of the filter medium. Or, in other words, the porosity of the filter medium has been greater adjacent the upstream face of the medium so as to capture the larger size particulate materials from a fluid stream to be treated and to then capture the smaller size particulate materials adjacent the downstream face of the filter medium. The prior art also has recognized that such a filtration function can be accomplished with the utilization of successively or immediately layered sheets of filter medium, the resulting filter media being of preselected increasing density and of finer or smaller porosity from upstream to downstream face of the layered facing sheets of filter medium.

In this regard, attention is directed to U.S. Pat. No. 5,082,476, issued to B. E. Kalbaugh et al on Jan. 21, 1992, and U.S. Pat. No. 5,275,743, issued to J. D. Miller et al, both of which patents teach more recent arrangements of immediate filter medium layering. Attentions further directed to U.S. Pat. No. 4,661,255 issued to G. Aumann et al on Apr. 28, 1987, and to U.S. Pat. No. 4,732,675, issued to A. Badolato et al on Mar. 22, 1988, both of which patents teach multi-layered filter medium of varying density but which also fail to recognize the inventive features set forth herein, let alone provide a unique apparatus and method to accomplish the novel arrangement herein described.

Finally, attention is directed to several bullets of interest relating to pore size characteristics: namely, ASTM, Designation F3 16-86, published April 1986 and entitled, "PORE SIZE CHARACTERISTICS OF MEMBRANE FILTERS BY BUBBLE POINT AND MEAN FLOW PORE TEST;" "Advances in Filtration and Separation Technology," Vol. 8, AFS Society pp. 97–99 (1994), entitled, "AIR PERMEABILITY AND PORE DISTRIBUTION OF A DUAL-LAYERED MICROGLASS FILTER MEDIUM," by Kyung-Ju Choi; Fluid Particle Separation Journal, Vol. 7, No. 1, March 1994 entitled, "PORE DISTRIBUTION AND PERMEABILITY OF CELLULOSIC FILTRATION MEDIA," by Kyung-Ju Choi; TAPPI 1995 Non-woven Conference, pp. 44–50, entitled, "PERMEABILITY PORE SIZE RELATIONSHIP OF NON-WOVEN FILTER MEDIA," by Kyung-Ju Choi; INJ., Vol. 6, No. 3, pp. 62–63, entitled, "PREDICTION OF AIR PERMEABILITY AND PORE DISTRIBUTION OF MULTI-LAYERED NON-WOVENS," by Kyung-Ju Choi; and, FLUID PARTICLE SEPARATION JOURNAL, Vol. 9, No. 2, June 1996, pp. 136–146, entitled, "FLUID FLOW THROUGH FILTER MEDIA AT A GIVEN DIFFERENTIAL PRESSURE ACROSS MEDIA," by Kyung-Ju Choi.

The present invention, recognizing the filtration capacity limitations of past filtering arrangements, as well as the reasons therefore, provides a unique and novel filter arrangement involving a structure and method for spacing successive medium layers which maximizes filtration capacity in a straightforward and economical manner and which requires a minimum of additional parts and operating steps to accomplish the same.

Various other features of the present invention will become obvious to one skilled in the art upon reading the disclosure set forth herein.

BRIEF SUMMARY OF THE INVENTION

More particularly the present invention provides a filter media of preselected face area including at least two successive layers of filter medium, each of preselected differing and successively decreasing average pore size successively arranged in upstream-downstream alignment in a flow channel for removing particulate matter from a fluid stream to be treated in the flow channel, spacer means of a higher average pore size than one of at least two successive layers of filter medium with a preselected spacing between the successive layers greater than the maximum pore size of the layers to create a fractionated distribution of particles between the successive spaced layers to maximize particulate holding capacity of the combined overall filter media. In addition, the present invention provides a method of filtering particulate materials from a particulate-laden fluid stream comprising: passing the fluid stream in a preselected confined space through a series of successive spaced upstream-downstream particulate filter medium removal zones, each zone including a layer of preselected filter medium pore size with the space between zones being of higher particulate permeability than any of the successive upstream-downstream filter medium zones and of a much greater distance between zones than the maximum pore size of the layers of filter medium.

It is to be understood that various changes can be made by one skilled in the art in one or more of the several parts and in one or more of the several steps in the apparatus and method disclosed herein without departing from the scope or spirit of the present invention. For example, filter medium layers and selective spacing of different medium materials and different preselected pore sizes compatible with the principles taught herein can be utilized without departing from the scope or spirit of the present invention.

BRIEF DESCRIPTION OF THE DRAWINGS

Referring to the drawings which schematically disclose one advantageous embodiment of the present invention and a modification thereof.

DETAILED DESCRIPTION OF THE INVENTION

The concept of filtering particulate-laden fluids through filtering media comprised of immediately layered, face-to-face filter medium of at least two sheets with the upstream layer having a larger pore size than the downstream layer is well known in the filtration arts—as can be seen in the patent references above noted. The present invention recognizes that this face-to-face layering of filtering mediums of preselected thickness results in the obfuscation or clouding-over of a number of pores in both upstream and downstream facing layers. For example, in successive immediately face-to-face filter medium layers, pores of larger size in an upstream layer of filter medium designed to capture larger particulates from a fluid stream will not be completely and fully aligned with smaller pores of the next downstream layer so as to capture smaller particulates from the fluid stream in such downstream layer and, as a result, the particulate filtering capacity of the immediately facing layered filter media decreases along with higher pressure drops occurring across the combined media.

Figure 1:
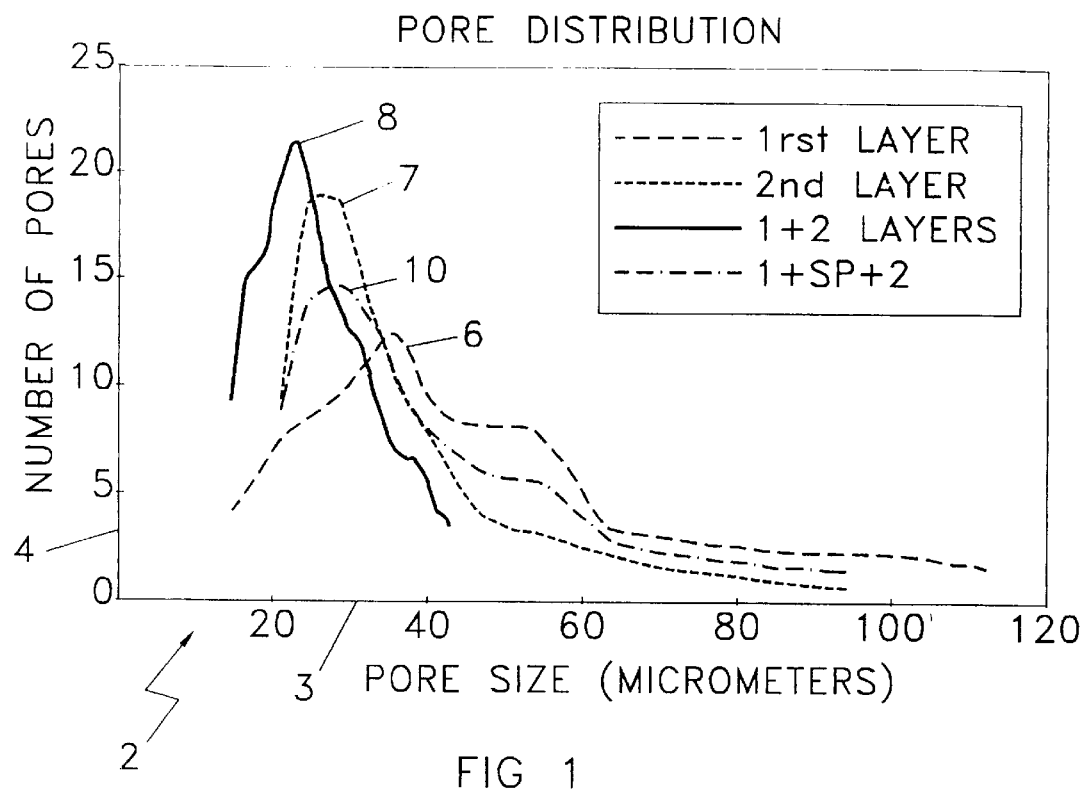
FIG. 1 is a pore distribution chart illustrating on the Y-axis the number of pores per unit area and, on the X-axis, the pore size (micrometers) for each of two preselected separate layers of filter medium, their combination when in immediately facing relation, and, their combination when in spaced relation.

As can be seen in FIG. 1 of the drawings, the graph illustration 2 demonstrates comparative pore distribution of two immediately facing upstream-downstream layers of preselected filter medium of preselected thickness. The X-axis 3 of the graph represents mean average pore size in micrometers, and the Y-axis 4 of the graph represents the number of pores per unit area. Considering the peak of each curve, the curve 6, represented by large dashes, illustrates an upstream layer of filter medium having by itself a pore size (X-axis) of approximately thirty-six (36) given units at the peak and a number of pores (Y-axis) of approximately thirteen (13) given units. The curve 7, represented by small dashes, illustrates a downstream layer of filter medium having by itself a pore size (X-axis) of approximately twenty-five (25) given units at the peak and a number of pores (Y-axis) of approximately eighteen (18) given units. When the upstream filter medium represented by curve 6 and the downstream filter medium represented by curve 7 are placed in immediately face-to-face combined relation, the curve 8, represented by a straight line, illustrates a pore size (X-axis) of less than twenty-five (<25) given units with the number of pores per unit area being approximately twenty-two (22) given units at the peak. When the upstream filter medium represented by curve 6 and the downstream filter medium represented by curve 7 are spaced from each other by an intermediate spacer or an appropriate spacer arrangement selected in accordance with the present invention, the curve 10, represented by a dash-dot, illustrates a pore size (X-axis) of twenty-five (25) given units with the number of pores per unit area being approximately fifteen (15) given units at the peak.

From these comparative curves, it can readily be seen that the overall pore size of immediately facing or laminated upstream-downstream filter medium layer 6 and filter medium layer 7 are substantially less than the combined individual sizes of each of the two filter medium layers 6 and 7 when each layer of filter medium layers 6 and 7 is considered separately. When a spacer sized in accordance with the invention is utilized, the pore size is approximately the same as the second or downstream layer 7, and the number of pores per given unit is approximately twenty-two (22) at the peak.

Alternatively, stated as a general principle, the capacity of a filter medium layer can be defined as the amount of particulate materials captured at a given terminal pressure drop. For example, if the pressure drop of an upstream layer is zero point zero three (0.03) inches of water separately considered and a downstream layer is zero point zero nine (0.09) inches of water separately considered both at the same face velocity of one hundred feet per minute (100 ft./min.), the pressure drop of laminated or immediately face-to-face layers at the same velocity would be zero point one nine (0.19) inches of water at the same face velocity. Additively, if each layer is considered separately with an inventive spacer therebetween, the additive pressure drop would be only zero point one two (0.12) inches of water.

Recognizing this laminate or immediate face-to-face discrepancy, the present invention provides for a separation of layers, advantageously, with a gap range of five (5) micrometers up to two (2) millimeters, depending upon anticipated particle size distribution and respective layer thickness. Further, the present invention recognizes that the spacing between layers may be accomplished with side spacers providing an open space between layers or with woven or non-woven materials or netting of preselected thickness (FIG. 3) or appropriate other novel arrangements as shown in FIGS. 4–7 of the drawings.

Figure 2:
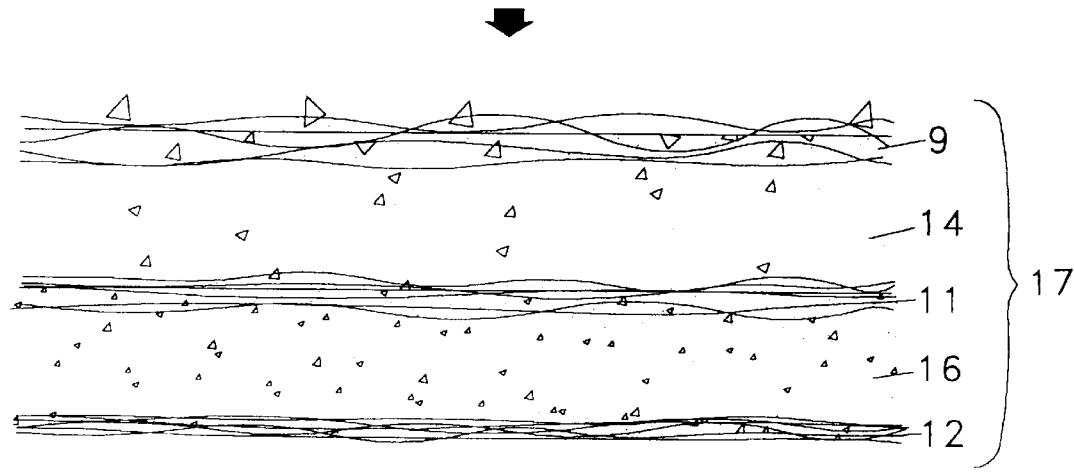
FIG. 2 is a schematic cross-sectional modified illustration of the present invention disclosing portions of three successively spaced and preselected layers of filter medium comprising a filter media with the upstream layer with respect to each downstream layer being of preselected larger particulate arresting porosity than such immediately successive downstream layer, the selective spacing between successive layers being in accordance with the teachings of the present invention.

Referring to FIG. 2 of the drawings, this figure represents a schematic, cross-sectional modified illustration of the present invention comprising three successively spaced and preselected layers of filter mediums 9, 11 and 12 to comprise a portion of the overall filter media 17. In this inventive illustration, the upstream filter medium layer 9 is spaced from the first downstream filter medium layer 11 by a suitably preselected first spacer 14, and the second downstream filter medium layer 12 is spaced from the first downstream filter medium layer 11 by a suitably preselected second spacer 16. The overall filter media 17 comprises the three preselected spaced filter medium layers 9, 11 and 12 respectively and the spacers 14 and 16. Although each of the filter medium layers 9, 11 and 12 can be formed from any one of a number of suitable materials, such as fiberglass or a preselected synthetic material or a natural material or composition thereof, and although each of the spacers 14 and 16 also can be formed from any one of such materials, or by just a screen or suitable netting or an open space provided by suitably positioned spacer rods or threads or woven or non-woven materials, in the advantageous embodiment disclosed, it will be assumed that the three aforementioned filter mediums 9, 11 and 12 and the two spacers 14 and 16 are all formed from preselected fiberglass or preselected synthetic material or natural or combinations of materials, the preselected porosity and thickness of each filter medium and each spacer varying in accordance with a known fluid stream velocity and with various distributions of the particulates to be removed.

Figure 3:
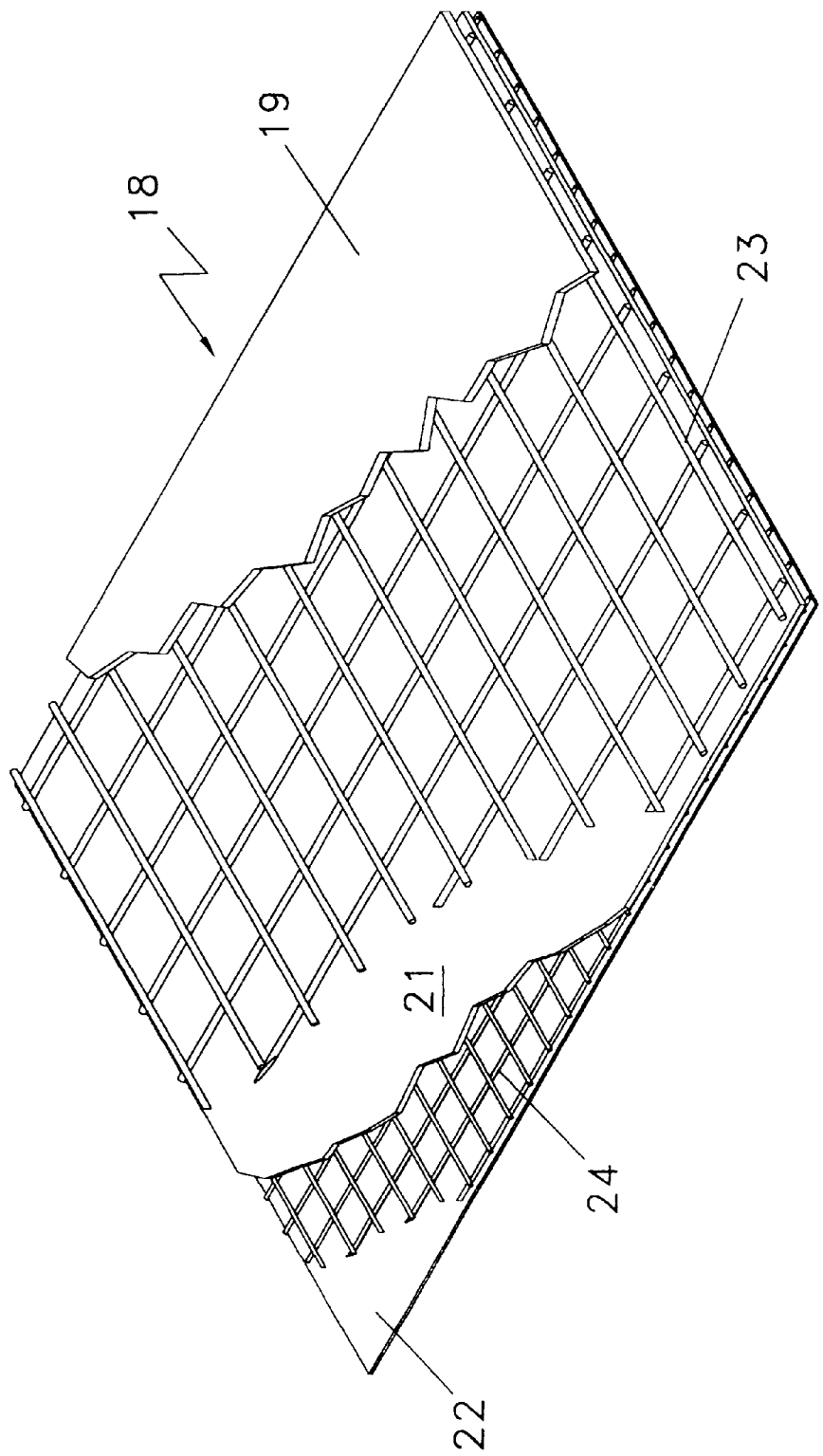
FIG. 3 discloses a further embodiment of the present invention in isometric view of a partially broken away portion of filter media, including three layered sheets of filter medium of consecutively smaller pore size with intermediate spacer members between layers sized in accordance with the present invention.

Referring to FIG. 3 of the drawings, which discloses a partially broken away portion of overall filter media 18, this figure also includes three successively spaced preselected layers of filter mediums 19, 21 and 22 comprising overall filter media 18. In this figure, the upstream filter medium layer 19 is spaced from the first downstream filter medium layer 21 by a suitably preselected first screen-like spacer grid 23 of comparatively larger side-by-side flow-through rectangular passages and the filter medium 21 of filter medium 18, spaced from filter medium 22 by a suitably preselected second screen-like spacer grid 24 of comparatively smaller side-by-side flow-through rectangular passages. Like the filter media 17, each of the filter medium layers 19, 21 and 22 can be formed from any one of suitable materials, such as fiberglass or preselected synthetic fibers or a natural material or combinations thereof of these materials. Further, the cross-sectional geometric configuration of the flow-through passages of spacers 23 and 24 can be other than rectangular. For example, such geometric, cross-sectional flow-through passages could be circular, oval or of diamond shape. Like the media 17 of FIG. 2, the preselected porosity and thickness of each filter medium 19, 21 and 22 and the cross-sectional area of flow-through passages of spacers 23 and 24 can be varied in accordance with a known fluid stream velocity and with the mean average cross-sectional areas of the particulates to be removed.

In a typical example of double layer substantially flat media, where a fluid air stream is determined to have an upstream entrance velocity of one hundred (100) feet per minute and a mean flow or average particulate pore size in the range of zero point five (0.5) μm to fifty (50) μm, a synthetic fiber material can be selected in a double layer arrangement similar to that disclosed in FIG. 2 of the drawings, given a flow channel of predetermined cross-sectional area for removing the particulate matter from the fluid stream to be treated. The upstream layer 9 can be selected to have a substantially uniform thickness of zero point eight six (0.86) mm and an average pore size of seventy-eight (78) μm, the spacer 14 between upstream filter medium layer 9 and the first downstream filter medium layer 11, which filter medium layer 11 can be selected to have an average pore size of forty-eight (48) μm with spacer 14 having a substantially uniform thickness of zero point three three (0.33) mm so that spacer 14 can serve to provide for fractional distribution of particles in the fluid stream of an average particulate size of two point one (2.1) μm, which is less than the four point seven (4.7) μm particle sizes separated by upstream filter medium layer 9. The first downstream layer 11 can separate out particles of one point four (1.4) μm average size, which average size is less than that average size of particles separated out by upstream filter medium layer 9. It is to be understood that the average pressure drop across this embodiment of two filter mediums 9 and 11 with a spacer 14 therebetween would be in combination zero point zero three (0.03) inches of water plus zero point zero nine (0.09) inches of water equals zero point one two (0.12) inches of water. It being noted that if layers 9 and 11 were laminated or in face-to-face relation without spacers, the pressure drop would be zero point one nine (0.19) inches of water or greater than the embodiment disclosed. Thus, with the filter arrangement as above described, the filtering capacity of each layer of filter medium is the additive sum of each filter medium maximally utilizing areas due to the before-described fractional distribution of spacers 14 and 16 and spacers 23 and 24 along with a lesser pressure drop than the pressure drop across immediately face-to-face laminated filter media.

Referring to FIGS. 4–7 of the drawings, there are disclosed several unique and novel modified arrangements which can be utilized to space substantially flat sheets of preselected filter media of preselected materials similar to one or more of those materials above discussed.

Figure 4:
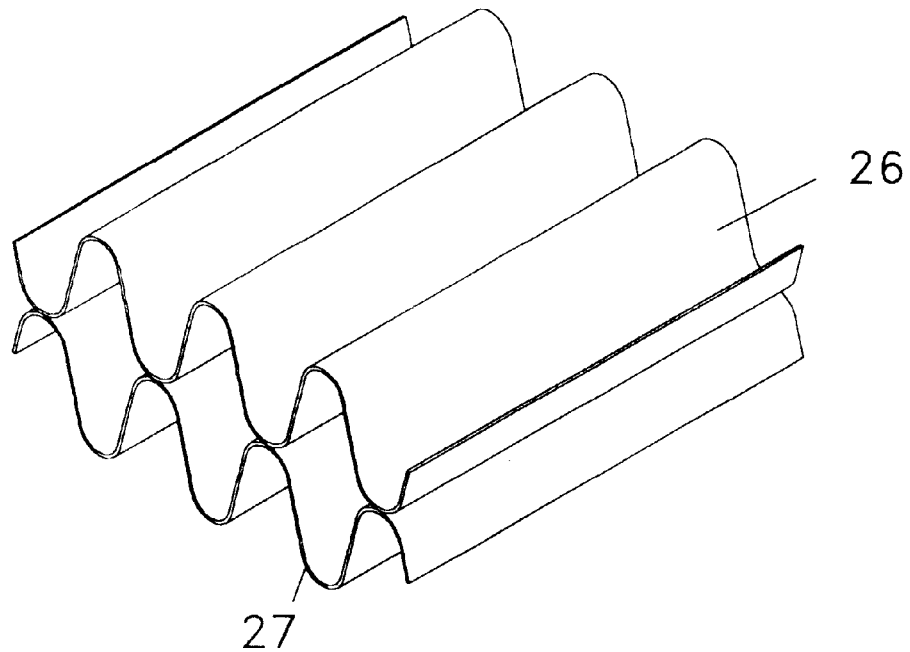
FIGS. 4–7 are several isometric views of modified arrangements which can be included to space or form part of the filter media arrangements of the present invention.

In FIG. 4, two selected sheets of filter mediums 26 and 27 are disclosed in pleated, crest-to-crest form to provide space for preselected filter medium or to provide by themselves a filter member-all in accordance with the above disclosure. It is to be understood that in addition to pleated material, corrugated material can be used.

Figure 5:
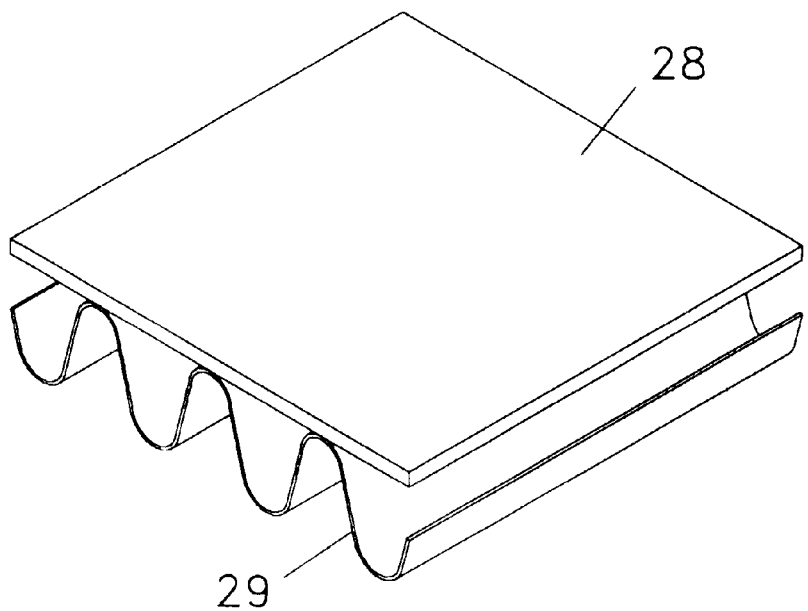

In FIG. 5, the novel arrangement includes a flat sheet of filter medium 28 with the crests of a spacer and/or filter medium 29 abutting the lower face of filter medium sheet 28.

Figure 6:
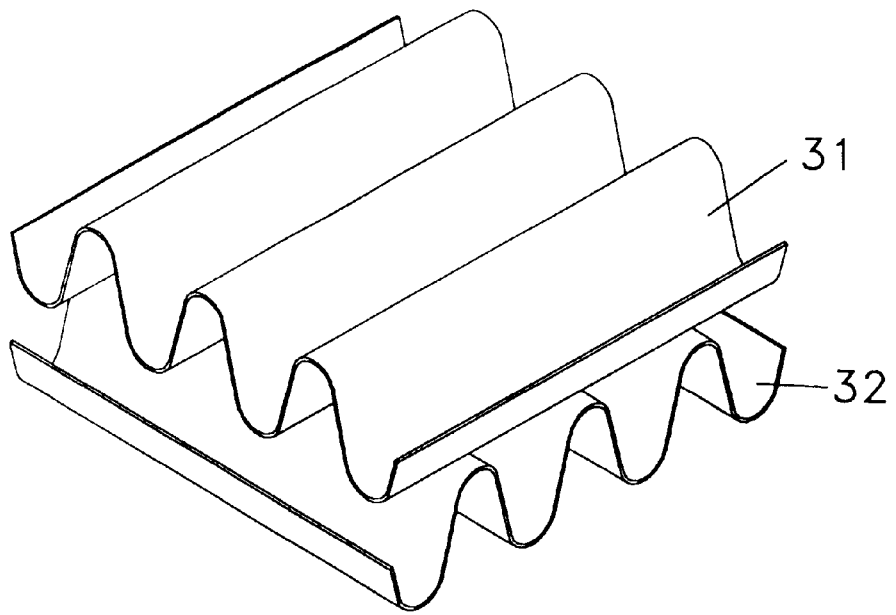

In FIG. 6, the novel arrangement includes pleated spacers and/or filter mediums 31 and 32 with the crests of one sheet abutting and extending at an angle to the other sheet.

Figure 7:
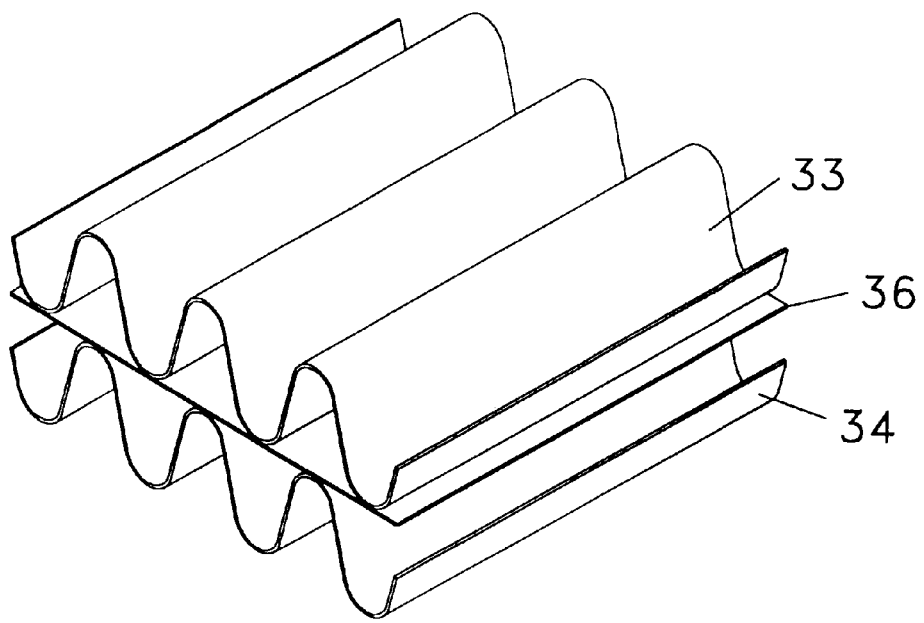

Finally, in FIG. 7, the novel arrangement includes pleated spacers and/or filter mediums 33 and 34 with a substantially flat sheet of filter medium 36 extending therebetween.

In order to design appropriate multi-layer media with capacity maximized, it is advantageous to develop a formula based upon the relationship between the mean flow pore size and thickness of the individual layers of multi-layer medium at a fixed differential pressure with the mean flow pore size being defined as the pore diameter when fifty percent (50%) of the total air passes through a wetted sample.

Let $M_1$, $M_2$ and $M_3$ be the total open areas of the top, middle and bottom of three successively spaced filter mediums spaced such as in FIG. 3. These may be represented by the mean flow pore size because the mean flow pore size is the area average pore size (see above references, key reference—Kyung-Ju Choi, Fluid/Particle Separation Journal, Vol. 7, No. 1, 1–3, March 1994). $L_1$, $L_2$ and $L_3$ are the thicknesses of the top, middle and bottom layers, and $P_1$, $P_2$ and $P_3$ are the differential pressure drops across the top, middle and bottom layers, respectively. The total separate additive pressure drop of the media will be $P=P_1+P_2+P_3$. The volumetric flow rate, Q, is assumed to be a constant at any layer of medium. The concept of the multi-layer filter media is that the top layer of filter medium is to catch big particles and that the lowest layer of filter medium is to capture small particles. To achieve the maximum capacity it may be necessary to maintain an equal share of terminal differential pressure drop on an individual layer of filter medium.

From Hagen-Poiseuille Law, Q may be given as:

$$Q = \frac{\pi P r^4}{8\mu L} = \frac{P(\pi r^2)^2}{\pi 8 \mu L} = \frac{PM^2}{\pi 8 \mu L} \qquad 1$$

Hence $$\text{Constant} = \frac{P_i M_i^2}{L_i} \qquad 2$$

Here i=1, 2 and 3 for triple layer medium, and $\mu$ is the viscosity of fluid.

By solving Equation 2 for the double layer medium:

$$\left(\frac{M_1}{M_2}\right)^2 = \frac{L_1}{L_2} \qquad 3$$

For the triple layer medium:

$$\left(\frac{M_2}{M_1 M_3}\right)^2 = \frac{L_2}{L_1 L_3} \qquad 4$$

Above equations 3 and 4 can be used to design the multi-layer filter media (with separated individual filter medium layers) by any means of spaces as above described at the initial stage of filtration. However, it is to be understood that the pole distribution and the mean flow pore size of each layer can change with time as a consequence of capturing particles in each filter medium layer. It is also to be noted that the incoming particle distribution changes as the particulate-laden fluid stream passes through the filter media. Equations 3 and 4 could be applied at the final stage of filtration or right before the terminal differential pressure. Each layer can be designed experimentally by installing pressure sensors in between each layer so that $P_1=P_2=P_3=P_4$, etc. at the terminal pressure.

The invention claimed is:

1. In a filter media arrangement including at least two successive layers of filter media held within a flow channel, each of preselected differing and successively decreasing average pore size in an upstream to downstream in-line flow direction for removing particulate matter from a fluid stream, said successive filter media layers having their adjacent faces preselectively spaced to create a free flowing distribution of particles parallel and within the boundaries of said layers without substantial confinement to maximize particulate holding capacity of the combined filter arrangement, wherein said spacing is determined by the mean flow pore size and the thicknesses of said filter media layers, and by the general distribution of particulate matter to be removed.

2. The filter media arrangement of claim 1, further comprising a scrim material of higher pore size than said successive filter media layers to provide a plurality of pores collectively forming a direct in-line free flowing particulate mixing chamber between said successive filter media layers, wherein said scrim material is positioned between said successive filter media layers and preselectedly space from said adjacent faces of said successive filter media layers.

3. The filter media arrangement of claim 1, wherein said successive filter media layers extending horizontally, and an upstream filter media layer of said successive filter media layers being of higher porosity than a downstream filter media layer.

4. The filter media arrangement of claim 1, wherein said successive filter media layers are in crested form along the length of said filter layers, adjacent crests abuttingly creating a free flowing distribution of particles parallel to said crests and within the boundaries of said filter layers.

5. The filter media arrangement of claim 1, wherein said successive filter media layers are in pleated form along the length of said filter layers, adjacent crests abuttingly aligned creating a free flowing distribution of particles parallel to said crests and within the boundaries of said filter layers.

6. The filter media arrangement of claim 1, wherein said successive filter media layers are in pleated form along the length of said filter layers, adjacent crests crossing at a preselected angle creating a free flowing distribution of particles parallel to said crests and within the boundaries of said filter layers.

7. The filter media arrangement of claim 1, wherein said successive filter media layers include at least one layer in pleated form along the length of said layer and one layer in substantially flat form with the crests of said pleated layer abutting a face of said flat layer creating a free flowing distribution of particles parallel to said crests and within the boundaries of said filter layers.

8. The filter media arrangement of claim 1, wherein the mean flow pore size of said successive filter media layers can be calculated by the equation, $$(M_1/M_2)^2 = L_1/L_2$$

when fifty percent of the total air passes through a wetted sample, wherein $L_1$ and $L_2$ are the thicknesses of the filter media layers and $M_1$ and $M_2$ are the mean flow pore sizes of the respective upstream and downstream layers of said successively spaced filter media layers separated by a first spacer of preselected porosity and thickness collectively forming a direct in-line free flowing particulate mixing chamber between said successive filter media layers.

9. The filter media arrangement of claim 8, having a third layer successively and preselectively spaced from said at least two successive layers of filter media, wherein said spacing is determined by the mean flow pore sizes and thicknesses of said filter media layers according to the equation, $$(M_2/M_1M_3)^2 = L_2/L_1L_3$$

wherein $L_1$, $L_2$ and $L_3$ are the respective thicknesses of the filter media layers and $M_1$, $M_2$ and $M_3$ are the respective mean flow pore sizes of said successively spaced filter media layers collectively forming a direct in-line free flowing particulate mixing chamber between said successive filter media layers.

10. A method of filtering particulate materials from a particulate-laden fluid stream in a filter media arrangement, the method includes the step of passing said fluid stream through at least two horizontally extending successive layers of filter media held within a flow channel, each of preselected pore size in an upstream to downstream in-line flow direction for removing particulate matter from a fluid stream, said successive filter media layers having their adjacent faces preselectively spaced to create a free flowing distribution of particles parallel and within the boundaries of said layers without substantial confinement to maximize particulate holding capacity of the combined filter arrangement, and said spacing is determined by the mean flow pore size and the thicknesses of said filter media layers, and by the general distribution of particulate matter to be removed.

11. A method of filtering particulate material of claim 10, wherein said successively and preselectively spaced filter media layers have a successively decreasing average pore size in said upstream to downstream in-line flow direction.

* * * * *